United States Patent [19]

Kagayama

[11] Patent Number: 4,488,774
[45] Date of Patent: Dec. 18, 1984

[54] SIDE REFLECTOR ASSEMBLY

[75] Inventor: Joe Kagayama, Osaka, Japan

[73] Assignee: Tsuyama Mfg. Co., Japan

[21] Appl. No.: 296,831

[22] Filed: Aug. 27, 1981

[30] Foreign Application Priority Data

Aug. 30, 1980 [JP] Japan .............................. 55-120546
Dec. 18, 1980 [JP] Japan .......................... 55-182795[U]

[51] Int. Cl.$^3$ .............................................. G02B 5/12
[52] U.S. Cl. .................................. 350/99; 301/375 A;
350/97
[58] Field of Search ................. 24/221 A; 350/97, 99,
350/107; 301/375 A

[56] References Cited

U.S. PATENT DOCUMENTS

| 3,781,082 | 12/1973 | Linder | 350/99 |
| 3,820,852 | 6/1974 | Kennedy | 301/37 R |
| 3,854,777 | 12/1974 | Kennedy | 301/37 |
| 3,947,070 | 3/1976 | Brilando et al. | 301/375 A |
| 4,006,877 | 2/1977 | Van Niel | 350/97 |
| 4,037,924 | 7/1977 | May | 350/97 |
| 4,037,925 | 7/1977 | Fleming | 350/97 |

Primary Examiner—Bruce Y. Arnold
Assistant Examiner—William Propp
Attorney, Agent, or Firm—Allegretti, Newitt, Witcoff & McAndrews, Ltd.

[57] ABSTRACT

A side reflector assembly is provided for mounting on a spoked wheel such as a bicycle. The assembly includes a plate-like reflector means and a cylindrical connector or coupler means to be coaxially fitted in the reflector means. The reflector means is provided at the center portion of its front face with a bottomed round aperture. The aperture is provided in the leading edge of the periphery thereof with a pair of notches for receiving a wheel spoke, and on the inner wall thereof adjacent to said notches with thicker wall portions. The reflector means is modified to have a set of three apertures on both sides thereof to accommodate different spoke arrangements.

7 Claims, 20 Drawing Figures

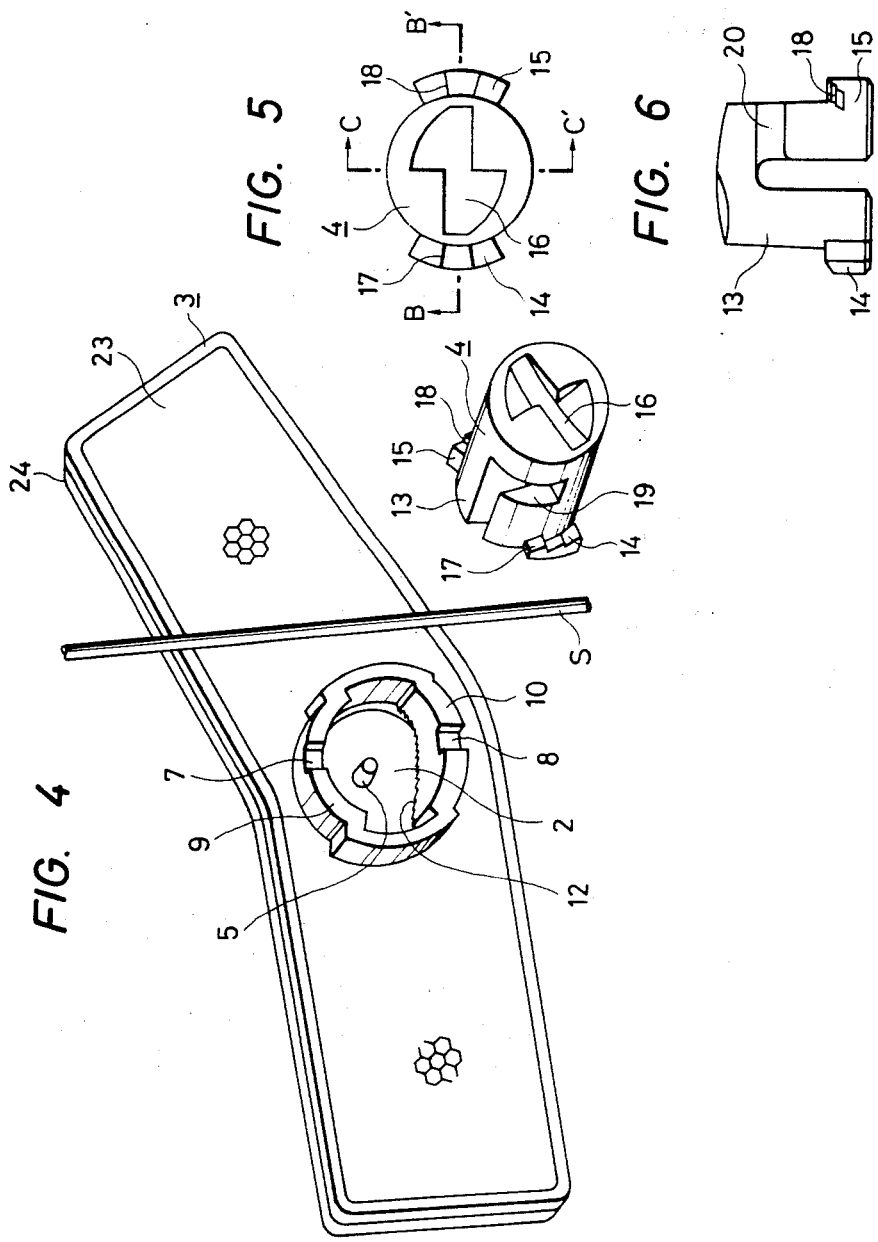

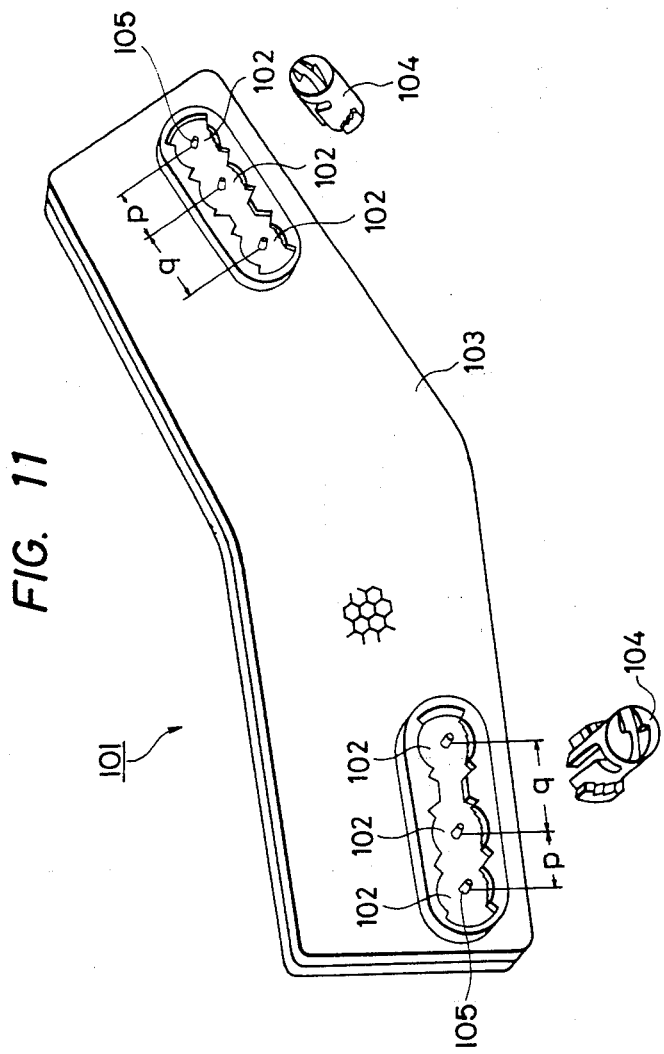

SIDE REFLECTOR ASSEMBLY

BACKGROUND OF THE INVENTION

The present invention relates generally to a side reflector assembly adapted to be mounted on a spoked wheel such as, for example, a bicycle or a motorcycle wheel, for safer riding. More particularly, this invention relates to a side reflector assembly which may be mounted on one or more spokes of such spoked wheel.

In the prior art, it is known to mount such a side reflector assembly on a wheel spoke by clamping the spoke by the bent portion of a U-shaped mounting plate, superimposing both its ends upon each other and securing the spoke to the side reflector by a screw. With this arrangement, however, it is required that the body of the side reflector, i.e., a reflector plate, the mounting plate and the screw be separately prepared, and mounted and coupled to the wheel spoke as a separate part. This arrangement is disadvantageous in that another separate part, a spring washer or the like, should be provided for preventing the side reflector assembly from getting loose. These separate parts are troublesome and time consuming to assemble.

Further, it has been proposed to use a side reflector comprising two parts between which a wheel spoke is clamped by means of a screw (see Japanese patent specification laid open for public inspection under No. 23597/1975). However, this arrangement offers similar problems.

Still further, it has been proposed to use a side reflector having therein an opening through which a hook member extends. This member is then hooked on a wheel spoke (see Japanese Utility Model specification laid open for public inspection under No. 41980/1976). However, this arrangement is deficient, since the wheel spoke thus hooked is positioned on the rear side of the side reflector as viewed by the workman. Further, the free or distal end of the hook member projects and forms a sharp edge or projection which may be dangerous.

SUMMARY OF THE INVENTION

The present invention provides a solution to the above-mentioned problems.

One object of the present invention is to provide a side reflector assembly which is simple in construction and can be attached tightly to a wheel spoke in a simplified manner, and which is characterized mainly by a cylindrical connector or coupler means for receiving a wheel spoke in its leg portion, and a reflector plate having at its substantially central portion a bottomed, round aperture in which the connector is inserted and locked.

Another object of the present invention is to provide a side reflector assembly characterized mainly by cylindrical connectors or couplers for receiving wheel spokes in their leg portions and a reflector plate having at portions adjacent to both its ends bottomed round apertures in which the connectors are inserted and locked. Other objects and advantages of the present invention will be made more apparent hereinafter.

BRIEF DESCRIPTION OF THE DRAWINGS

These and other objects, features and advantages of the present invention will become apparent from a reading of the following detailed description in connection with preferred embodiments illustrated in the drawings, in which:

FIG. 4 is an exploded view of the reflector assembly prior to mounting on the spoke of a wheel;

FIG. 5 is a plan view of the cylindrical connector means used in the embodiment of FIG. 1;

FIG. 6 is a side view of the cylindrical connector means of FIG. 5;

FIG. 11 is an exploded view of a second embodiment of the side reflector assembly according to the present invention;

DESCRIPTION OF THE PREFERRED EMBODIMENT

Figure 1:
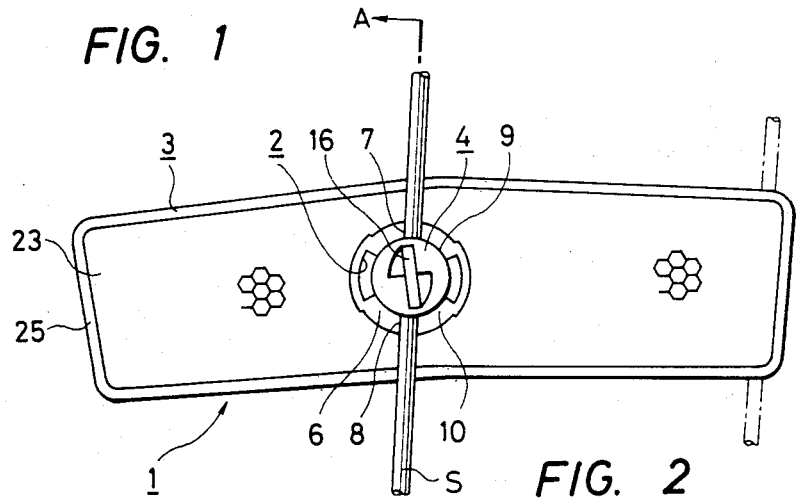
FIG. 1 is a front view of one preferred embodiment of the side reflector assembly according to the present invention.
Figure 2:
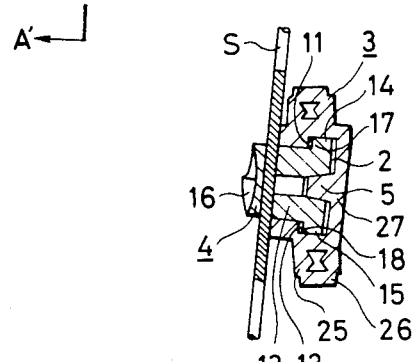
FIG. 2 is a cross sectional view taken along line A—A' of FIG. 1.
Figure 3:
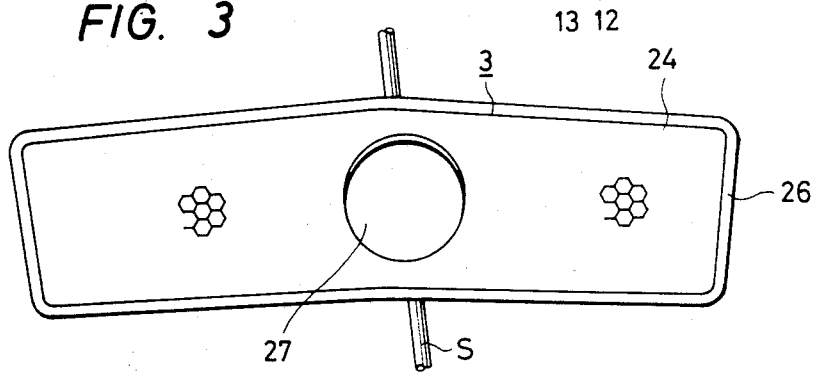
FIG. 3 is a rear view of FIG. 1.

Referring to FIGS. 1 to 3, a side reflector assembly shown generally at 1 and designed to be mounted on a wheel spoke includes a reflector plate 3 formed of plastic, for example, a polymethacrylate-based resin. The reflector plate 3 is provided at the front face of its central portion with a bottomed round aperture 2. The aperture 2 is opened forward. A cylindrical connector or coupler 4 formed of a plastic, for example, polyacetal-based resin is adapted to be coaxially fitted in the aperture 2.

The round aperture 2 is formed at the middle of its bottom with a boss 5, and has also in the leading edge 6 of its periphery a pair of notches 7 and 8 for receiving a wheel spoke S. Portions 9 and 10 of the inner wall of the aperture 2 adjacent to the notches 7 and 8 have a greater thickness so as to uniformly reduce the inner diameter of the aperture 2. Portions 9 and 10 are provided in their rear sides with toothed grooves 11 and 12, which are each of a saw-toothed shape in cross section.

The cylindrical connector 4 includes a rearwardly extending bifurcated leg portion 13 for retaining a spoke S, and lateral pieces 14 and 15 extending outwardly from both ends of the leg portion 13. The head of the bifurcated leg portion 13 is grooved at 16 for the application of a screw driver. Both lateral pieces 14 and 15 are provided in the front faces with toothed grooves 17 and 18, which are of a saw-toothed shape in cross section.

As will be seen especially from FIG. 4, the leg portion 13 of the cylindrical connector 4 is insertable into the bottomed round aperture 2 in the reflector plate 3 with the spoke S passing through and retained in the notches 7 and 8 in reflector plate 3. This means that the lateral pieces 14 and 15 provided on both ends of the connector 4 pass through opposed recesses in the wall defining the round aperture 2 and are not in abutting engagement with the thicker wall portions 9 and 10 of the aperture 2. After insertion into the bottomed round aperture 2, a screw driver or the like is fitted in the groove 16 in the head of connector 4 to rotate it clockwise. The front faces of both lateral pieces 14 and 15 are of a spiral or inclined disposition and irreversibly slidable relative to the rear ends of the thicker wall portions 9 and 10. In this way, the reflector plate 3 and the cylindrical connector 4 can be attached tightly to the spoke S.

The cylindrical connector 4 will be further described with reference to FIGS. 5 to 10. Radially extending slits 19 and 20 are provided in communication with a gap defined by the bifurcated leg portion 13. These slits are required to permit rotation of the connector 4 relative to the spoke S and the reflector 3 after insertion into the aperture 2 in the reflector 3 across the spoke S.

Figure 7:
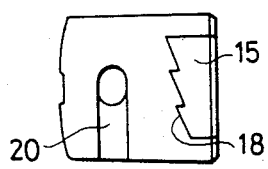
FIG. 7 is another side view of the cylindrical connector means of FIG. 5, taken at 90° with respect to the view of FIG. 6.
Figure 9:
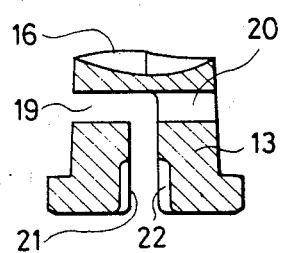
FIG. 9 is a cross sectional view taken along line B—B' of FIG. 5.
Figure 8:
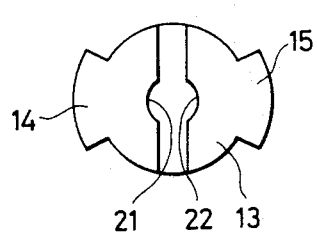
FIG. 8 is a bottom view of the cylindrical connector means of FIG. 5.
Figure 10:
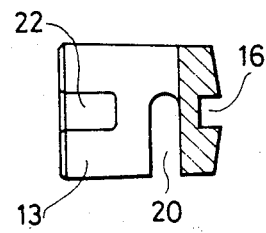
FIG. 10 is a cross sectional view taken along line C—C' of FIG. 5.

As best seen in FIGS. 4, 6, and 7, the grooves 17 and 18 on lateral pieces 14 and 15 are disposed in a spiral or inclined configuration. When the grooves 17 and 18 are in engagement with the grooves 11 and 12 and the cylindrical connector 4 is rotated, the cylindrical connector 4 will be drawn inwardly because of the inclination of grooves 17 and 18 to cause the cylindrical connector 4 to tightly grip a spoke S.

Guide grooves 21 and 22 (FIGS. 8-10) are formed in the inner sides of the leg portion 13 for receiving the boss 5 extending from the bottom of the aperture 2 in the reflector plate 3.

Referring next to FIGS. 11 to 20, there is shown a second embodiment of the side reflector assembly according to the present invention, which is designed to be mounted on two wheel spokes. More specifically, this embodiment is also capable of being mounted on virtually any wheel, as discussed later. This feature is important since, although most bicycle or motorcycle wheels possess the same basic components, the wheels are different diameters and the number of spokes on a wheel may be different, hence the spoke arrangement may vary from wheel to wheel.

Turning now to FIGS. 11 to 20, a side reflector assembly shown generally at 101 comprises a reflector plate 103 preferably formed of plastic, such as polymethacrylate-based resin having at each of the portions adjacent to the right and left ends a set of three bottomed round apertures 102 which are opened forwardly. A cylindrical connector or coupler 104 made from plastic, such as polyacetal-based resin is fitted into an associated aperture 102.

The bottomed round aperture 102 in the reflector plate 103 has a boss 105 provided at the central portion of its bottom face, and wall portions 106 greater in thickness than the remaining portion as viewed in the radially inward direction. The thicker wall portion 106 is stepped at 107 (FIG. 12) at the rear face in the saw-toothed form.

The bottomed round aperture 102 has a center axis m (FIG. 20) inclined at an angle with respect to the reflector plate 103. A set of three apertures 102 are different in pitch p, q, from one another (FIG. 11), and are positioned in symmetry with another set of three apertures 102 on the reflector plate 103.

The cylindrical connector 104 (FIG. 12) includes a head 108, a pair of legs 109 extending rearwardly from head 108, and outer pieces 110 extending radially and outwardly from legs 109. The outer pieces 110 include front faces which are stepped or have a saw-toothed form as shown at 111. The stepped faces 111 are inclined and are adapted to be engaged with the aforesaid stepped portions 107 of surface 106. Such engagement prevents rotation of the cylindrical connector 104 in the direction indicated by an arrow B and also tightens the engagement of the side reflector or assembly 101 to the spoke, thus readily accommodating spokes of different diameter. The head 108 is provided at the top with a groove 112 for receiving a screwdriver which is used for twistedly turning the cylindrical connector 104. Half portions 113 of both walls of groove 112 are diagonally cut out so as to avoid accidental rotation of the cylindrical connector 104 in the direction opposite to the direction B.

Figure 13:
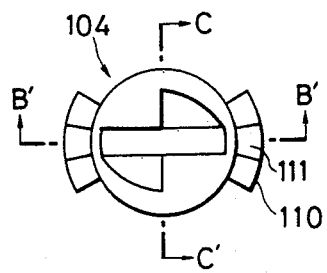
FIG. 13 is a plan view of the cylindrical connector means illustrated in FIG. 11.
Figure 14:
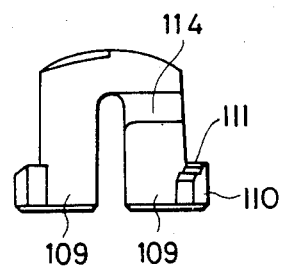
FIG. 14 is a side view of the cylindrical connector means of FIG. 13.
Figure 15:
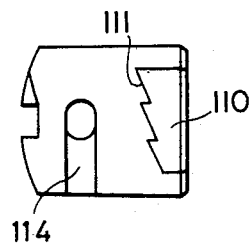
FIG. 15 is another side view of the cylindrical connector means of FIG. 13 taken at 90° with respect to the view of FIG. 14.
Figure 16:
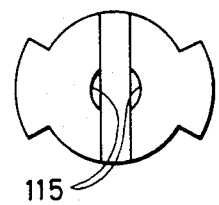
FIG. 16 is a bottom view of the cylindrical connector means of FIG. 13.
Figure 17:
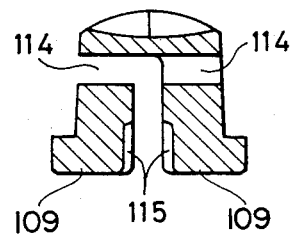
FIG. 17 is a cross sectional view of the cylindrical connector means taken along line B—B' of FIG. 13.
Figure 18:
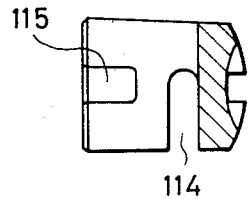
FIG. 18 is a cross sectional view of the cylindrical connector means taken along line C—C' of FIG. 13.

Referring to FIGS. 13 and 18 the cylindrical connector 140 is provided with a slit 114 in communication with a space between the legs 109. This slit 114 is required for effecting twisted turning of the cylindrical connector 104 with respect to the associated spoke S and the reflector 103 after insertion of the connector 104 into the corresponding bottomed round aperture 102.

Figure 12:
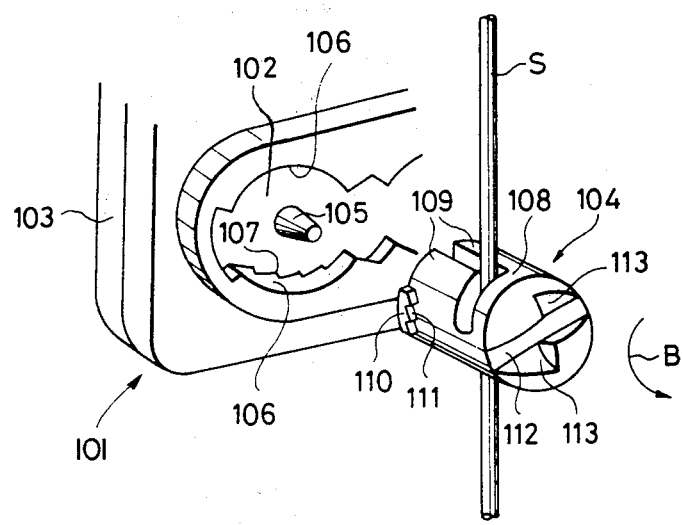
FIG. 12 is a view illustrative of the manner for attaching the side reflector assembly of FIG. 11 to the spokes of a wheel.

Guide grooves 115 (FIGS. 16-18) are provided in the inner walls of the leg 109 for permitting smooth receipt of the boss 105 formed on the bottomed round aperture 102 (FIG. 12).

Figure 19:
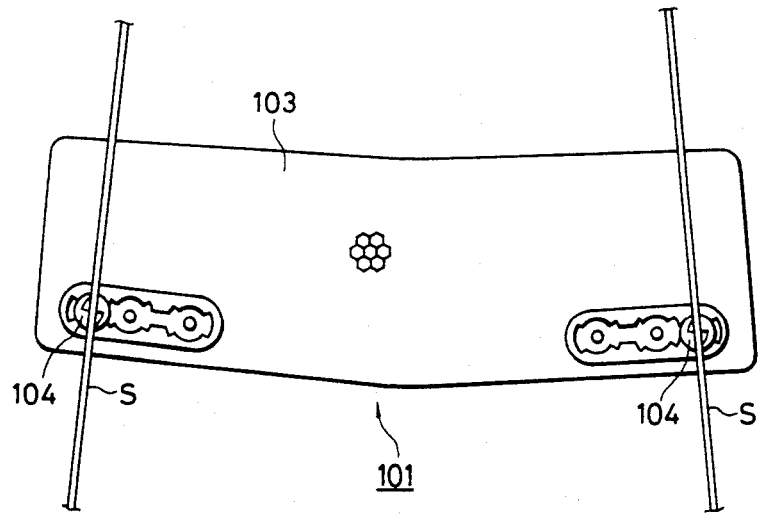
FIG. 19 is a front view of the side reflector assembly of FIG. 11 mounted on the spoke of a wheel.
Figure 20:
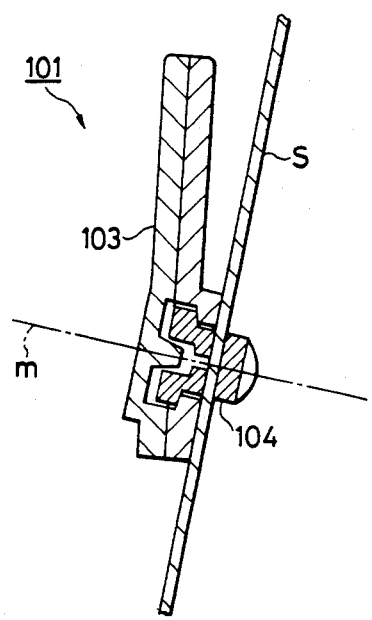
FIG. 20 is a vertical cross sectional view of FIG. 19, inclusive of the spoke.

Attachment of the side reflector assembly 101 can be carried out by retaining a spoke S in the space between the legs 109 of cylindrical connector 104, inserting the legs 109 through recesses in the associated bottomed round aperture 102 in the reflector plate 103 until the outer pieces 110 are below the stepped portions 107, and, successively, twistedly rotating the cylindrical 104 connector in the direction B. FIGS. 19 and 20 illustrate the side reflector assembly 101 in assembled relationship according to the present invention.

When the side reflector assembly 101 is thus assembled, the cylindrical connector 104 is locked on the reflector plate 103, since the inclined stepped faces 111 of outer pieces 110 are caused to mesh irreversibly with the stepped portions 107 of the thicker wall portions 106 of the aperture 102. This provides a substantially integral unit and assures very tight attachment of the side reflector assembly 101 to the spokes, regardless of the diameter of the spoke S.

In comparison with the prior art screw-type arrangement, the side reflector assembly 101 according to the present invention can easily and simply be locked in place, since this can be achieved simply by rotating the cylindrical connector 4 in a one-quarter (¼) arc.

The side reflector assembly 101 according to the present invention does not incur such inconveniences as encountered in the arrangement designed to be attached to a single spoke, for example, its incidental revolution or sliding around or along the spoke, and its displacement.

Furthermore, it is possible to accurately apply the reflector assembly to six types of spoke arrangements by selection of proper apertures from two sets of three apertures 102 arranged side-by-side on both sides of the reflector plate 103 at different pitches p, q. In this connection, commercially available tires are normally now of six sizes, namely 20, 22, 24, 26, 27 and 28 inches, respectively, and six spoke arrangements are applicable, correspondingly.

In addition, incident light can constantly be reflected by both sides of the reflector plate 103 in the uniform direction. This is because the central axis m of the bottomed round aperture 102 is inclined at an angle with the reflector plate 103 so that, when mounted on the spokes, the plate 103 is substantially vertically positioned.

The reflector plates 3 and 103, respectively, of the two embodiments of the present invention disclosed are each of the cube-corner type. The reflector plates 3 includes two plate-like members 23 and 24 each having at its rear side a number of retro-reflective pyramidal cuts that are capable of reflecting incident light in substantial parallel relationship therewith. The reflector plate 3 may be made by forming the two plate-like reflector members 23 and 24 into an integral plate as by bonding. A member 27 used in the first embodiment forms a bottom wall of the aperture 2. The material of which the reflector plate 3 and 103 or the connectors 4 and 104 is formed is not critical. For example, the connectors 4 and 104 may be formed of a nylon-based resin, a polycarbonate-based resin, as well as an aluminium zinc die cast.

It will be understood that various modifications may be made within the spirit and scope of the invention and therefore the invention is to be limited by the appended claims.

What is claimed is:

1. A side reflector assembly, designed to be mounted on the spoke of a wheel, comprising: a reflector means provided on one face of the side reflector assembly said face having a bottomed, round aperture which is opened forward; and a cylindrical connector means coaxially fitted into the bottomed, round aperture;

said bottomed, round aperture provided in the leading edge of the periphery thereof with a pair of notches for receiving a wheel spoke, and provided, on the inner wall thereof adjacent to said notches, with thicker wall portions so as to uniformly reduce the inner diameter of the aperture;

said cylindrical connector means having a rearwardly extending bifurcated leg portion for retaining a wheel spoke, and a having lateral piece extending outwardly from both ends of said leg portion; and said cylindrical connector means inserted at the leg portion in said bottomed round aperture across a wheel spoke passing through said notches, and rotated in coaxial relation to the spoke and the reflector means, whereby the front faces of both lateral pieces are irreversibly slidable with respect to the rear faces of the thicker wall portions.

2. The assembly as recited in claim 1, wherein said bottomed, round aperture is provided at the central portion of its bottom with a boss which is insertable in the bifurcated leg portion during attachment of said cylindrical connector means.

3. The assembly as recited in claim 1 or 2, wherein front faces of said lateral pieces and rear faces of said thicker wall portions are provided with tooth-grooves which are of a saw-toothed shape in section.

4. A side reflector assembly having right and left ends and designed to be mounted on the spokes of a wheel, comprising: a reflector means provided adjacent to each said right and left end each, said reflector means having at least one bottomed, round aperture which is opened forward; and a cylindrical connector means inserted and locked in each of the apertures;

said bottomed, round apertures each having at least two wall portions that are greater in thickness than the wall thickness of the remaining wall portion as viewed in the radially inward direction;

said cylindrical connector means including a head, a pair of leg portions extending rearwardly from the head, and outer pieces extending radially and outwardly from the peripheral portion of the rear ends of the leg portions; and said cylindrical connector means inserted at the leg portion in a relative spoke, and twistedly rotated until the outer pieces take tight abutment upon the thicker wall portions of the aperture, whereby said reflector assembly is tightly attached to the relative spokes.

5. The assembly as recited in claim 4, wherein each of said bottomed, round apertures is provided at the central portion of its bottom with a boss which is insertable between said leg portions.

6. The assembly as recited in claim 4 or 5, wherein rear faces of said thicker portions and front faces of said outer pieces are provided with stepped portions in a saw-toothed form, and wherein said stepped portions are capable of meshing with each other.

7. The assembly as recited in claim 4, wherein a set of three bottomed, round apertures arranged side-by-side at different pitches are formed at each portion of the reflector means which is adjacent to the right or left end.

* * * * *